(12) United States Patent
Shigeoka (10) Patent No.: US 8,303,190 B2
(45) Date of Patent: Nov. 6, 2012

(54) WHEEL BEARING APPARATUS FOR A VEHICLE

(75) Inventor: Kazuhisa Shigeoka, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/626,790

(22) Filed: Nov. 27, 2009

(65) Prior Publication Data

US 2010/0129018 A1    May 27, 2010

Related U.S. Application Data

(63) Continuation of application No. PCT/JP2008/001327, filed on May 28, 2008.

(30) Foreign Application Priority Data

May 29, 2007 (JP) ................................. 2007-141994

(51) Int. Cl.
*F16C 13/00* (2006.01)
(52) U.S. Cl. ........................................................ 384/544
(58) Field of Classification Search .................. 384/477, 384/478, 479, 480, 481, 482, 483, 484, 485, 384/486, 544, 589; 277/346, 347, 348, 349, 277/350, 351, 352, 353, 358, 549, 562, 565
See application file for complete search history.

(56) References Cited

U.S. PATENT DOCUMENTS

| 3,510,138 A * | 5/1970 | Bowen et al. ................ 384/478 |
| 6,592,264 B2 * | 7/2003 | Yabe et al. .................... 384/484 |
| 2005/0062233 A1 * | 3/2005 | Iketani ......................... 277/549 |
| 2005/0110221 A1 * | 5/2005 | Oates ........................... 277/549 |
| 2007/0031079 A1 * | 2/2007 | Komori et al. ............... 384/589 |

FOREIGN PATENT DOCUMENTS

| JP | 2005-212713 | 8/2005 |
| JP | 2005-291485 | 10/2005 |
| JP | 2005-337423 | 12/2005 |

OTHER PUBLICATIONS

English translating generated Jan. 7, 2011 of JP2005-291485.*

* cited by examiner

*Primary Examiner* — James Pilkington
(74) *Attorney, Agent, or Firm* — Harness, Dickey & Pierce, P.L.C.

(57) ABSTRACT

A vehicle wheel bearing apparatus has an outer member, an inner member, double row rolling elements, and seals mounted within annular openings formed between the outer member and the inner member. A metal annulus, mounted on the base portion, is press-formed of steel plate. The metal annulus has a cylindrical fitting portion, a curved portion, a disk shaped portion, and an overhang portion. The outer side seal of the seals has a metal core and a sealing member with side lips and a grease lip. The side lips and the grease lip sliding contact the metal annulus. The metal annulus overhang portion opposes the outer member via a slight radial gap and is formed with a flared configuration that gradually expands toward its end at a predetermined slant angle.

7 Claims, 4 Drawing Sheets

PRIOR ART

WHEEL BEARING APPARATUS FOR A VEHICLE

CROSS-REFERENCE TO RELATED APPLICATIONS

This application is a continuation of International Application No. PCT/JP2008/001327, filed May 28, 2008, that claims priority to Japanese Application No. 2007-141994, filed May 29, 2007. The disclosures of the above applications are incorporated herein by reference.

FIELD

The present disclosure relates to a vehicle wheel bearing apparatus that rotatably supports a wheel of vehicle, such as an automobile and, more particularly, to a vehicle wheel bearing apparatus intended to improve its sealability.

BACKGROUND

A wheel bearing apparatus that supports a vehicle wheel has a rotatably supported wheel hub that mounts a wheel. The wheel hub is supported via a rolling bearing. The apparatus is for driving wheels and driven wheels. For structural reasons, the inner ring rotation type is used for driving wheels and both inner ring rotation type and outer ring rotation type are used for driven wheels. In order to have a desirable bearing rigidity, durability for miss-alignments and superiority in fuel consumption, double row angular contact ball bearings with a small rotational torque have been used. On the other hand, double row tapered roller bearings have been used for heavy duty vehicles such as off-road cars or trucks.

Since the wheel bearing apparatus is usually arranged at a place liable to be splashed by muddy water etc., a sealing apparatus is arranged between an outer member and an inner member to seal the space between them. Generally, a sealing member of the sealing apparatus has sealing lips. The sealing member is mounted on the outer member forming a secured side member. The sealing lips slidingly contact the outer circumferential surface of the inner member.

Figure 3:
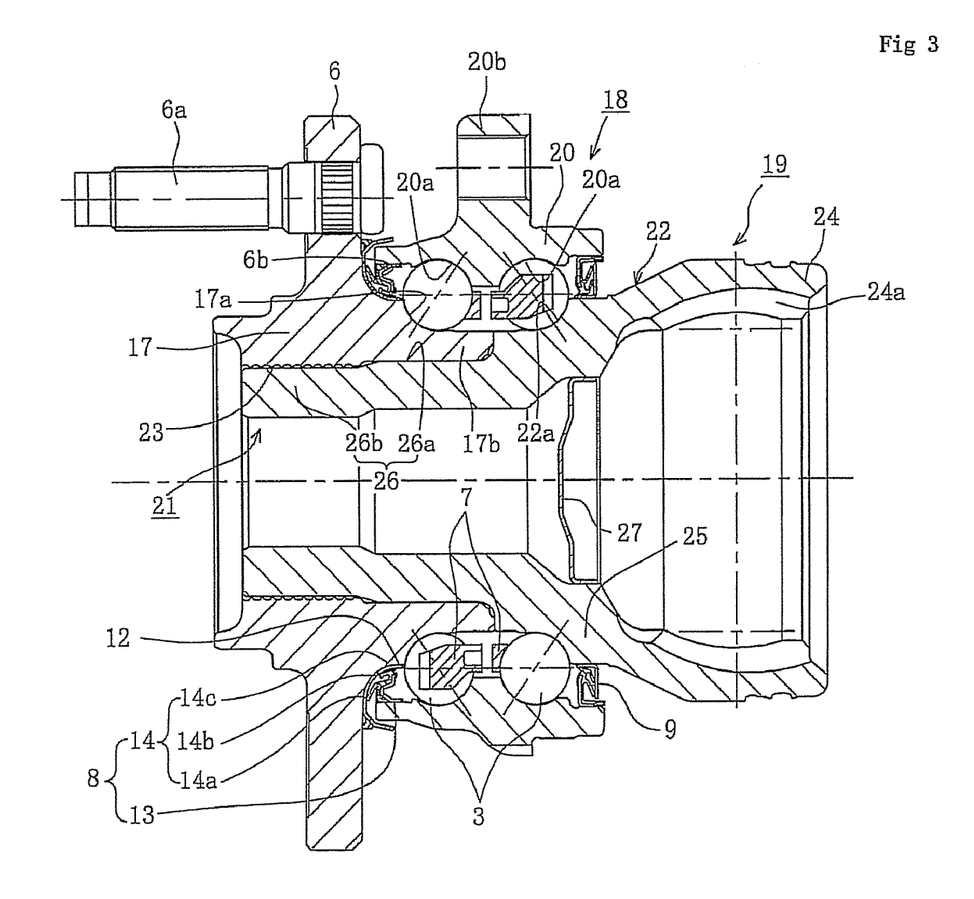
FIG. 3 is a longitudinal section view of a second preferred embodiment of the vehicle wheel bearing apparatus.
Figure 4:
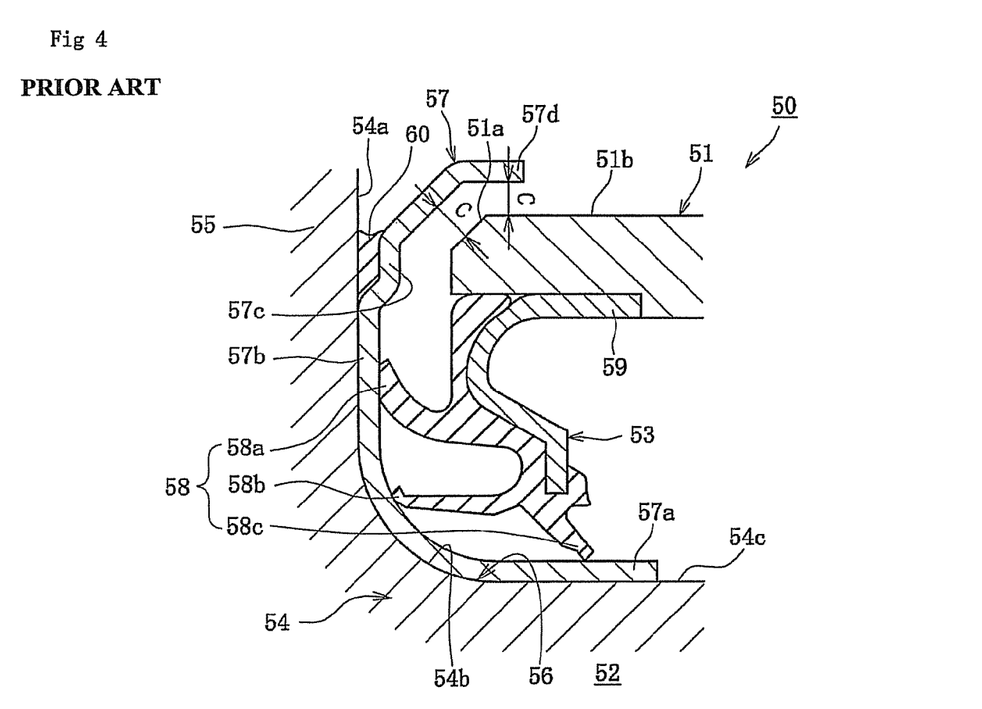
FIG. 4 is a partially enlarged view of a prior art sealing apparatus of a vehicle wheel bearing apparatus.

One example of such a wheel bearing apparatus is shown in FIG. 3. The wheel bearing apparatus 50 includes an outer member (outer ring member) 51 immovably secured on a body of a vehicle. An inner member (inner ring member) 52 is rotatably mounted on the outer member, via balls (not shown). A wheel (not shown) is mounted on the inner member 52 rotatably relative to the body of the vehicle. Since the wheel bearing apparatus 50 is arranged at a place that is liable to be splashed by muddy water etc., a sealing apparatus is arranged between the inner member 52 and the outer member 51.

The sealing apparatus includes a sealing member 53 fit into the inner circumference of the end of the outer member 51. A metal annulus 57 is fit onto a base 56 of a wheel mounting flange 55 of a wheel hub 54. The sealing member 53 includes an elastic sealing member 58 with an annular configuration. A metal core 59 supports the elastic sealing member 58. The elastic sealing member 58 includes three annular sealing lips 58a, 58b 58c. The sealing lip 58a, 58b and 58c are formed so that they can be arranged, respectively, near a flange surface 54a of the wheel hub 54, a curved surface 54b of the wheel hub 54, and an outer circumference 54c of the shoulder portion of the wheel hub 54.

The metal annulus 57 has a fitting portion 57a fit onto an outer circumference 54c of the shoulder of the wheel hub 54. A flange portion 57b is arranged to be in close contact with a flange surface 54a of the wheel hub 54. A seal mounting portion 57c, formed with a crank shaped cross-section, extends in a direction away from the flange surface 54a of the wheel hub 54. A non-contact sealing portion 57d axially extends along a chamfered portion 51a of the outer member 51. A gap or clearance "C" between the inner side surface of the non-contact sealing portion 57d and the chamfered portion 51a and the outer circumference 51b of the outer member 51 is set to have a very narrow dimension.

An elastic member 60 is mounted in a sealing space, formed between the flange surface 54a and the seal mounting portion 57c, after the fitting portion 57a of the metal annulus 57 is fit onto the outer circumference of the shoulder portion of the wheel hub 54. Thus, the flange portion 57b of the metal annulus 57 is in close contact with the flange surface 54a of the wheel hub 54. In addition, a labyrinth seal is formed by the clearance "C" between the inner side surface of the non-contact sealing portion 57d and the chamfered portion 51a and the outer circumference 51b of the outer member 51.

The elastic member 60 mounted in the sealing space can prevent the entry of muddy water etc. into the contacting portion between the metal annulus 57 and the wheel hub 54. The labyrinth seal, formed by the gap or clearance "C" between the inner side surface of the non-contact sealing portion 57d and the chamfered portion 51a and the outer circumference 51b of the outer member 51, can prevent the entry of muddy water etc. into the sliding contact portion between the sealing member 53 and the metal annulus 57.
Patent Document 1: Japanese Laid-open Patent Publication No. 291485/2005

However, one problem of the prior art is that once muddy water etc. has entered through the slight gap or clearance "C", it is difficult to discharge it to the outside of the bearing apparatus. Accordingly, the muddy water etc. dwells on the elastic sealing member 58 adhering to the slide-contacting surface of the sealing lip 58a. Thus, this causes abnormal wear. Accordingly, it is difficult to provide a wheel bearing apparatus that can improve the sealability of the seal and maintain a desirable bearing performance for a long term.

SUMMARY

Therefore, it is an object of the present disclosure to provide a wheel bearing apparatus that can improve the sealability of the seal and maintain a desirable bearing performance for a long term.

To achieve the object, a vehicle wheel bearing apparatus is provided that comprises an outer member formed with a body mounting flange on its outer circumference. The body mounting flange is to be mounted on a body of a vehicle. The outer member inner circumference includes double row outer raceway surfaces. An inner member includes a wheel hub and an inner ring or an outer joint member of a constant velocity universal joint. The wheel hub is formed at one end with a wheel mounting flange. The outer circumference of the wheel hub includes one inner raceway surface opposing one of the double row outer raceway surfaces. A cylindrical portion axially extends from the inner raceway surface. The inner ring or an outer joint member of a constant velocity universal joint is press-fit onto the cylindrical portion of the wheel hub. The outer circumference of the inner ring includes the other inner raceway surface opposing the other of the double row outer raceway surfaces. Double row rolling elements are freely rollably contained between the outer and inner raceway surfaces of the outer and inner members. Seals are mounted within annular openings formed between the outer member and the inner member. An inner side base portion of the wheel mounting flange is formed with a circular arc cross-section. A metal annulus mounted on the base portion is press-formed from a steel plate. The metal annulus includes a cylindrical fitting portion fit onto a shoulder portion of the wheel hub. Additionally, it includes a curved portion formed with a circular arc cross-section that corresponds to a cross-sectional configuration of the base portion. A disk shaped portion extends radially outward from the curved portion. The disk shaped portion closely contacts the inner side surface of the wheel mounting flange. An overhang portion extends from a radially outermost portion of the disk shaped portion in a direction away from the wheel mounting flange. An outer side seal of the seals include a metal core fit into an inner circumference of an end of the outer member. A sealing member has side lips that slant radially outward and a grease lip that slants radially inward toward the inner side of the bearing. The side lips and the grease lip slidingly contact the metal annulus. The inner side base portion of the wheel mounting flange is formed with a circular arc cross-section with a radius of curvature "r". The curved portion of the metal annulus corresponding to the circular arc cross-section of the inner side base portion is formed with a circular arc cross-section with a radius of curvature "R". The radii of curvature "r" and "R" are set with a relationship $R \geq r$.

Accordingly, the seals are mounted within annular openings formed between the outer member and the inner member. A metal annulus is mounted on the base portion and is formed with a circular arc cross-section. The metal annulus is press-formed from a steel plate. The metal annulus includes a cylindrical fitting portion, a curved portion, a disk shaped portion, and an overhang portion. The cylindrical fitting portion is fit onto a shoulder portion of the wheel hub, The curved portion is formed with a circular arc cross-section that corresponds to a cross-sectional configuration of the base portion. The disk shaped portion extends radially outward from the curved portion and is in close contacted with the inner side surface of the wheel mounting flange. The overhang portion extends from a radially outermost portion of the disk shaped portion in a direction away from the wheel mounting flange. An outer side seal of the seals includes a metal core fit into an inner circumference of an end of the outer member. A sealing member has side lips that slant radially outward and a grease lip that slants radially inward toward the inner side of the bearing. The side lips and the grease lip are in sliding contact with the metal annulus. The inner side base portion of the wheel mounting flange is formed with a circular arc cross-section with a radius of curvature "r". The curved portion of the metal annulus corresponding to the circular arc cross-section of the inner side base portion is formed with a circular arc cross-section with radius of curvature "R". The radii of curvature "r" and "R" are set with a relationship $R \geq r$. Thus, it is possible to prevent the curved portion of the metal annulus from floating from the base of the wheel mounting flange by interference of the curved portion of the metal annulus against the base portion of the wheel mounting flange. This prevents the generation of an interstice between the side surface of the wheel mounting flange and the disc shaped portion of the metal annulus. Thus, it is possible to suppress variation of interference of the side lips and assure stable sealability.

The metal annulus has an overhang portion axially extending from the radially outermost portion of the disc shaped portion in a direction away from the wheel mounting flange. The overhang portion opposes an outer circumference of the outer member via a slight radial gap. The overhang portion of the metal annulus opposes the outer circumference of the outer member via the slight radial gap. It is formed with a flared configuration gradually diverging toward its end at a predetermined slant angle. This prevents entry of muddy water etc. into the slide-contacting portion between the seal and the metal annulus due to the labyrinth effect formed by the inner circumferential surface of the overhang portion and the outer circumference of the outer member. Thus, it discharges the once entered muddy water etc. from the bearing apparatus due to the centrifugal force caused by rotation of the metal annulus and to the tapered configuration of the overhang portion of the metal annulus. Thus, this provides a wheel bearing apparatus that improves the sealability of the seal and maintains the bearing performance for a long term.

The radial gap between the overhang portion of the metal annulus and the outer circumference of the outer member is set at 1 mm or less in diameter. The slant angle is set at 15° or less. This makes it possible to improve the sealability by an advantageous labyrinth effect without causing any interference between the overhang portion and the outer member.

The base portion of the wheel mounting flange is formed with a circular arc cross-section with a predetermined radius of curvature "r". The curved portion of the metal annulus is formed with a circular arc cross-section with a predetermined radius of curvature "R". The radius of curvature "R" corresponds to the circular arc cross-section of the base portion. The radii of curvature "r" and "R" are set with a relationship $R \geq r$. This makes it possible to prevent the curved portion of the metal annulus from floating from the base of the wheel mounting flange by interference of the curved portion of the metal annulus against the base portion of the wheel mounting flange. Thus, this prevents the generation of an interstice between the side surface of the wheel mounting flange and the disk shaped portion of the metal annulus. Thus, it is possible to suppress the variation of interference of the side lips and assure stable sealability.

An axially projecting elastic member is integrally adhered to a transition portion between the disc shaped portion and the overhang portion of the metal annulus. The elastic lip elastically contacts the inner side surface of the wheel mounting flange, via a predetermined interference. This prevents floating of the metal annulus and improves the degree of close contact. In addition, it makes it possible to prevent foreign matter from entry into the bearing apparatus. Thus, this prevents the generation of corrosion in the base portion and mounting portion of the metal annulus for a long term.

The surface roughness of the steel plate forming the metal annulus is set within a range of 0.2-0.6 Ra. This makes it possible to obtain a good sealing sliding contact surface. Thus, this suppresses wear of the lips and maintains the sealing performance of the seal even it is used under severe circumstances.

The metal annulus is made of a steel plate with corrosion resistance. This prevents the generation of corrosion for a long term and maintains sealability.

The vehicle wheel bearing apparatus comprises an outer member formed with a bodying mounting flange on its outer circumference. The body mounting flange is to be mounted on a body of a vehicle. The outer member inner circumference includes double row outer raceway surfaces. An inner member includes a wheel hub and an inner ring or an outer joint member of a constant velocity universal joint. The wheel hub is formed on one end with a wheel mounting flange. The wheel hub outer circumference includes one inner raceway surface opposing one of the double row outer raceway surfaces. A cylindrical portion axially extends from the inner raceway surface. The inner ring or the outer joint member of a constant velocity universal joint is press-fit onto the cylindrical portion of the wheel hub. The ring or outer joint member is formed, on its outer circumference, with the other inner raceway surface opposing the other of the double row outer raceway surfaces. Double row rolling elements are freely rollably contained between the outer and inner raceway surfaces of the outer and inner members. Seals are mounted within annular openings formed between the outer member and the inner member. An inner side base portion of the wheel mounting flange is formed with a circular arc cross-section. A metal annulus, mounted on the base portion, is press-formed from a steel plate. The metal annulus includes a cylindrical fitting portion, a curved portion, a disk portion and an overhang portion. The cylindrical fitting portion is fit onto a shoulder portion of the wheel hub. The curved portion is formed with a circular arc cross-section that corresponds to a cross-sectional configuration of the base portion. The disk shaped portion extends radially outward from the curved portion and is in close contact with the inner side surface of the wheel mounting flange. The overhang portion extends from a radially outermost portion of the disk shaped portion in a direction away from the wheel mounting flange. An outer side seal of the seals includes a metal core and a sealing member. The metal core is fit into an inner circumference of an end of the outer member. The sealing member has side lips that slant radially outward. A grease lip slants radially inward toward the inner side of the bearing. The side lips and the grease lip slidingly contact the metal annulus. The inner side base portion of the wheel mounting flange is formed with a circular arc cross-section with a radius of curvature "r". The curved portion of the metal annulus corresponding to the circular arc cross-section of the inner side base portion is formed with a circular arc cross-section with radius of curvature "R". The radii of curvature "r" and "R" are set with a relationship R≧r. Thus, it is possible to prevent the curved portion of the metal annulus from floating from the base of the wheel mounting flange by interference of the curved portion of the metal annulus against the base portion of the wheel mounting flange. This prevents the generation of an interstice between the side surface of the wheel mounting flange and the disc shaped portion of the metal annulus. Thus, it is possible to suppress variation of interference of the side lips and to assure stable sea lability.

A vehicle wheel bearing apparatus comprises an outer member formed with a body mounting flange on its outer circumference. The body mounting flange is to be mounted on a body of a vehicle. The outer member inner circumference includes double row outer raceway surfaces. An inner member includes a wheel hub and an inner ring. The wheel hub is formed on one end with a wheel mounting flange. The wheel hub outer circumference includes one inner raceway surface opposing one of the double row outer raceway surfaces. A cylindrical portion axially extends from the inner raceway surface. The inner ring is press-fit onto the cylindrical portion of the wheel hub. The inner ring outer circumference includes the other inner raceway surface opposing the other of the double row outer raceway surfaces. Double row rolling elements are freely rollably contained between the outer and inner raceway surfaces of the outer and inner members. Seals are mounted within annular openings formed between the outer member and the inner member. An inner side base portion of the wheel mounting flange is formed with a circular arc cross-section. A metal annulus is mounted on the base portion and is press-formed from a steel plate with corrosion resistance. The metal annulus includes a cylindrical fitting portion, a curved portion, a disk portion and an overhang portion. The cylindrical fitting portion is fit onto a shoulder portion of the wheel hub. The curved portion is formed with a circular arc cross-section that corresponds to a cross-sectional configuration of the base portion. The disk shaped portion extends radially outward from the curved portion and is in close contact with the inner side surface of the wheel mounting flange. The overhang portion extends from a radially outermost portion of the disk shaped portion in a direction away from the wheel mounting flange. An outer side seal of the seals includes a metal core and sealing member. The metal core is fit into an inner circumference of an end of the outer member. The sealing member has side lips that slant radially outward and a grease lip that slants radially inward toward the inner side of the bearing. The side lips and the grease lip slidingly contact the metal annulus. The overhang portion of the metal annulus opposes an outer circumference of the outer member via a radial gap of 1 mm or less in diameter. The over hang portion is formed with a flared configuration that gradually expands toward its end at a slant angle of 15° or less.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Preferred embodiments of the present disclosure will be hereinafter described with reference to the drawings.

Figure 1:
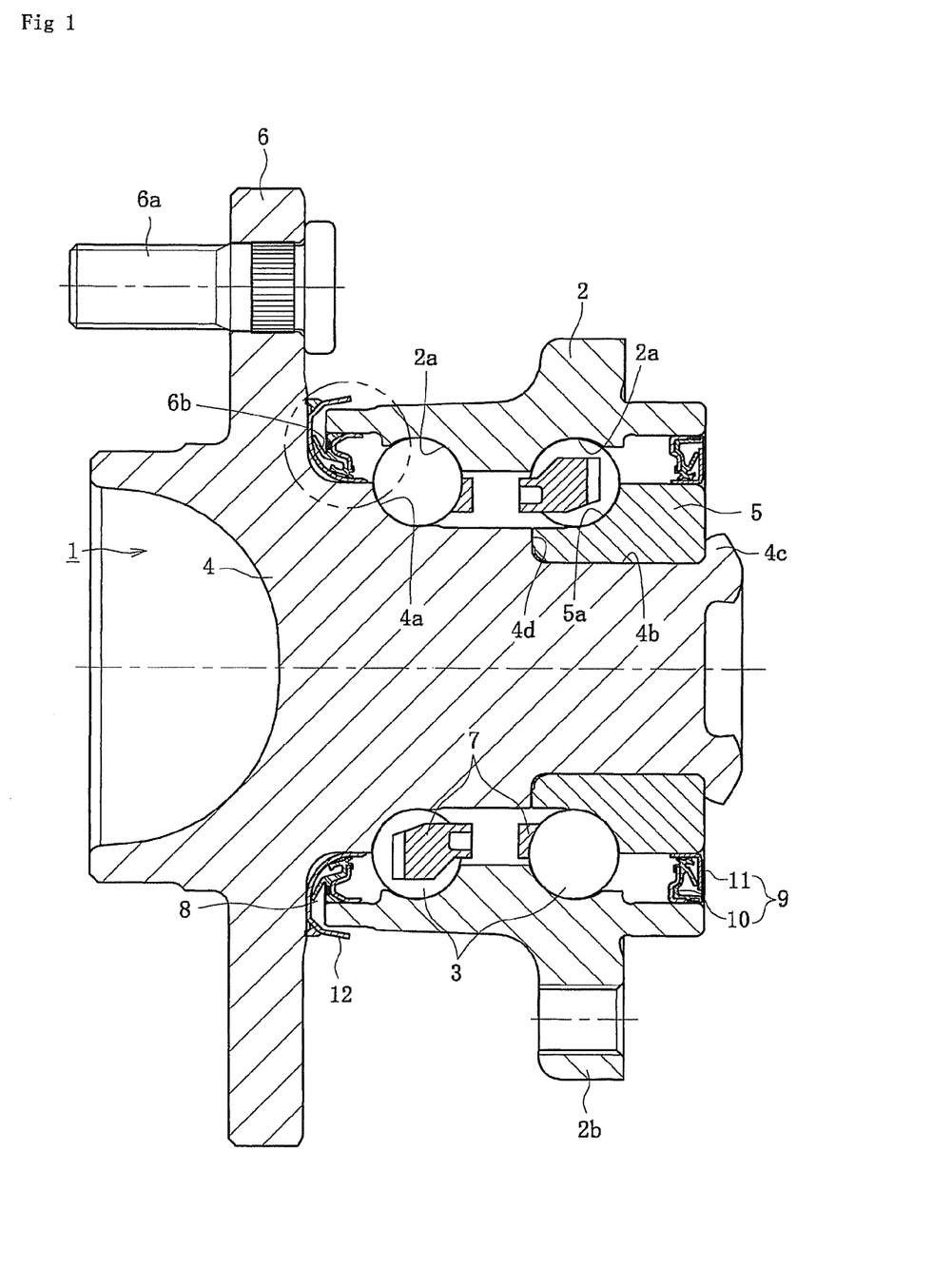
FIG. 1 is a longitudinal section view of a preferred embodiment of the vehicle wheel bearing apparatus.
Figure 2:
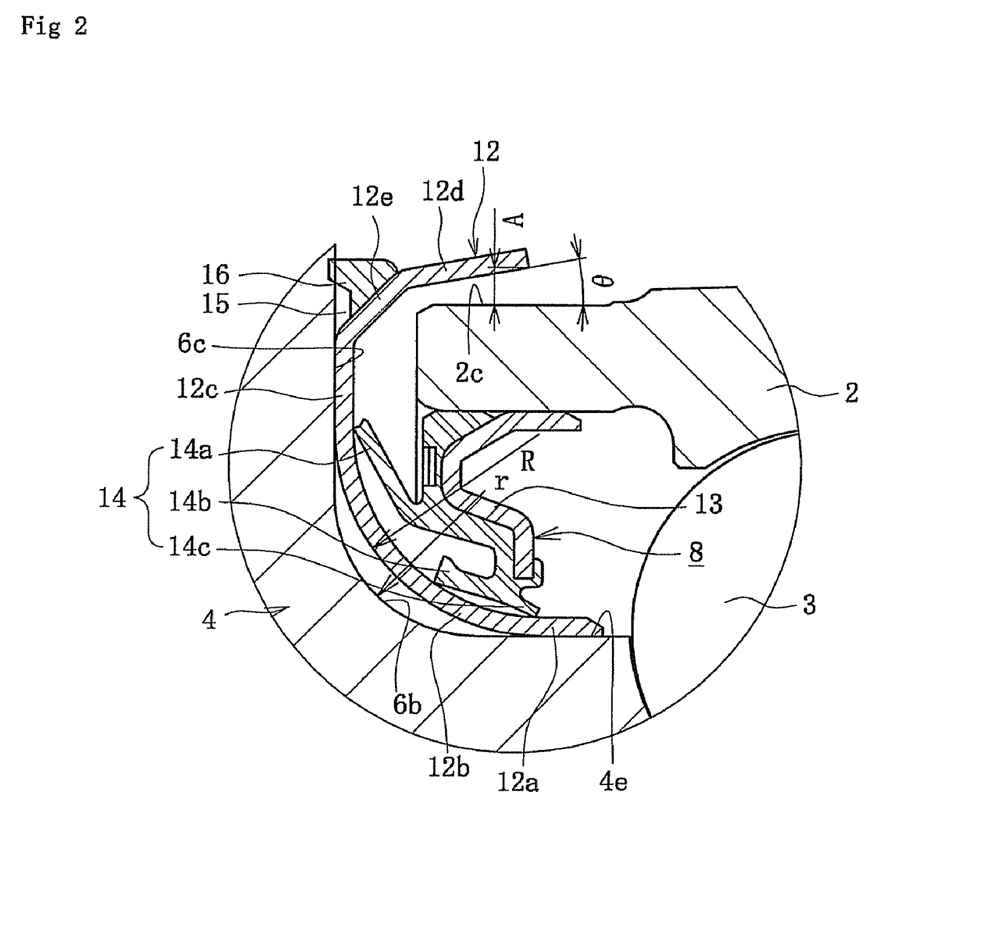
FIG. 2 is a partially enlarged view of FIG. 1.

FIG. 1 is a longitudinal section view of a first preferred embodiment of the vehicle wheel bearing apparatus for a vehicle. FIG. 2 is a partially enlarged view of FIG. 1. In the descriptions below, the term "out side" defines a side that is positioned outside of a vehicle body (left-hand side in drawings). The term "inner side" defines a side that is positioned inside of a vehicle body (right-hand side in drawings) when the bearing apparatus is mounted on the vehicle body.

The vehicle wheel bearing apparatus of the present disclosure is a third generation type used for a driven wheel. It includes an inner member 1, an outer member 2, and double row rolling elements (balls) 3, 3 rollably contained between the inner and outer members 1, 2. The inner member 1 includes a wheel hub 4 and an inner ring 5 secured onto the wheel hub 4.

The wheel hub 4 is integrally formed with a wheel mounting flange 6 at one end. One (outer side) inner raceway surface 4a is formed on the wheel hub outer circumference. A cylindrical portion 4b extends from the inner raceway surface 4a. Hub bolts 6a are arranged on the wheel mounting flange 6 equidistantly along the periphery of the wheel mounting flange 6. The inner ring 5 is formed with the other (inner side) inner raceway surface 5a on its outer circumference. The inner ring 5 is press-fit onto the cylindrical portion 4b of the wheel hub 4 via a predetermined interference. The inner ring 5 is axially secured on the wheel hub 4 by a caulked portion 4c. The caulked portion is formed by plastically deforming the end of the cylindrical portion 4b.

The wheel hub 4 is made of medium/high carbon steel including carbon of 0.40-0.80% by weight such as S53C. It is hardened by high frequency induction quenching so that a region from an inner side base 6b of the wheel mounting flange 6 to the cylindrical portion 4b, via a step 4d, is hardened to have a surface hardness of 58-64 HRC. The caulked portion 4c is not quenched and remains as is with its surface hardness after forging. Accordingly, the wheel mounting flange 6 has a sufficient mechanical strength against rotary bending loads applied to it. Also, the anti-fretting strength of the cylindrical portion 4b at a region press-fit by the inner ring 5 can be improved. In addition, the generation of micro cracks in the caulked portion 4c during the caulking process can be prevented.

The outer member 2 is integrally formed with a body mounting flange 2b on its outer circumference. The body mounting flange 2b is to be mounted on a knuckle (not shown) of a vehicle. The outer member inner circumference includes double row outer raceway surfaces 2a, 2a opposite to the inner raceway surfaces 4a, 5a of the inner member 1.

The outer member 2 is made of medium/high carbon steel including carbon of 0.40-0.80% by weight such as S53C. The double row outer raceway surfaces 2a, 2a are hardened by high frequency induction quenching to have a surface hardness of 58-64 HRC. The inner ring 5 and balls 3 are made of high carbon chrome steel such as SUJ2. They are hardened to their core by dip quenching to have a surface hardness of 58-64 HRC. Double row balls 3, 3 are contained between the outer and inner raceway surfaces of the outer member 2 and the inner member 1 and are rollably held by cages 7, 7 to form a double row angular contact ball bearing of a back-to-back duplex type.

Seals 8, 9 are mounted within annular openings formed between the outer member 2 and the inner member 1. The seals 8, 9 prevent leakage of grease contained in the bearing. Also, they prevent entry of rainwater and dusts into the bearing from the outside. The inner side seal 9 forms a so-called "pack seal". It has an annular sealing plate 10 and a slinger 11. Each has a substantially L-shaped cross-section and is arranged toward each other.

A metal annulus 12 is mounted on the inner side base 6b of the wheel mounting flange 6. The outer side seal 8 is arranged to be in sliding contact with the metal annulus 12. As shown in the enlarged view of FIG. 2, the seal 8 includes a metal core 13 and a sealing member 14. The metal core 13 is fit into the inner circumference of the outer side end of the outer member 2. The sealing member 14 is integrally adhered to the metal core 13, via vulcanized adhesion. The metal core 13 is press-formed from austenitic-stainless steel sheet (JIS SUS 304 etc.) or preserved cold rolled steel sheet (JIS SPCC etc.) and is formed with a "C" shaped cross-section.

The sealing member 14 is adhered to the outer side surface of the metal core 13. The sealing member includes a pair of side lips 14a, 14b and a grease lip 14c. The pair of side lips 14a, 14b extends from the sealing member 14 and is slanted radially outward. The grease lip 14c is adhered to the inner circumferential edge of the metal core 13. The grease lip 14c extends radially inward and is slanted toward the inner side of the bearing. The side lips 14a, 14b and the grease lip 14c slidingly contact the metal annulus 12 mounted on the inner side base 6b of the wheel mounting flange 6. The sealing member 14 extends to a radially outer slanted portion of the metal core 13 to prevent entry of foreign matter such as muddy water, etc. through the fitting portion between the outer member 2 and the metal core 13.

The metal annulus 12 is press-formed from steel plate with corrosion resistance, such as austenitic-stainless steel sheet (JIS SUS 304 etc.) or preserved cold rolled steel sheet (JIS SPCC etc.). The metal annulus 12 includes a cylindrical fitting portion 12a, a curved portion 12b, a disk shaped portion 12c, and an overhang portion 12d. The cylindrical fitting portion 12a is fit onto a shoulder portion 4e of the wheel hub 4. The curved portion 12b is formed with a circular arc cross-section that corresponds to a cross-sectional configuration of the base portion 6b. The disk shaped portion 12c extends radially outward from the curved portion 12b and is in close contact with the inner side surface 6c of the wheel mounting flange 6. The overhang portion 12d extends from a radially outermost portion of the disk shaped portion 12c in a direction away from the wheel mounting flange 6.

The surface roughness of steel plate forming the metal annulus 12 is set within a range of 0.2-0.6 Ra. This obtains a good sealing sliding contact surface. Thus, this suppresses wear of the lips and maintains the sealing performance of the seal even if it is used under severe circumstances. "Ra" is one of the surface roughness parameter of JIS (JIS B0601-1994). It means an arithmetical average roughness that is an average value of absolute value deviation from an average line.

The base portion 6b of the wheel mounting flange 6 is formed with a circular arc cross-section with a predetermined radius of curvature "r". The curved portion 12b of the metal annulus 12 is formed with a circular arc cross-section with a predetermined radius of curvature "R". The radius of curvature "R" corresponds to the circular arc cross-section of the base portion 6b. The radii of curvature "r" and "R" are set with a relationship R≧r. This prevents floating of the curved portion 12b of the metal annulus 12 from the base 6b of the wheel mounting flange 6 by interference of the curved portion 12b of the metal annulus 12 against the base portion 6b of the wheel mounting flange 6. Thus, this prevents the generation of an interstice between the side surface 6c of the wheel mounting flange 6 and the disk shaped portion 12c of the metal annulus 12. Thus, it is possible to suppress the variation of interference of the side lips 14a, 14b and to assure stable sealability.

In addition, an axially projecting elastic lip 16 is arranged in an annular sealing space 15 formed between the side surface 6c of the wheel mounting flange 6 and the metal annulus 12. The elastic lip 16 is integrally adhered, via vulcanized adhesion, to a connecting portion 12e of the metal annulus 12 between the disk shaped portion 12c and the overhang portion 12d. The elastic lip 16 elastically contacts the side surface 6c of the wheel mounting flange 6 with a slight contacting force via a predetermined interference. This prevents floating of the metal annulus 12 and improves the degree of close contact. In addition, it is possible to prevent foreign matter from entry into the bearing apparatus. Thus, this prevents the generation of corrosion in the base portion 6b and mounting portion of the metal annulus 12 for a long term.

The overhang portion 12d of the metal annulus 12 is formed with a flared configuration that gradually expands toward its end at a predetermined slant angle relative to the outer circumference 2c of the outer member 2. The overhang portion 12d opposes an outer circumference 2c of the outer member 2 via a slight radial gap or clearance A to form a labyrinth seal between the two. The radial gap A is set at a maximum of 1 mm in diameter. The slant angle θ is set within a range of 0<θ≦15°. If the slant angle θ is set larger than 15°, muddy water etc. would easily enter into the bearing apparatus.

Due to the labyrinth effect formed by the inner circumferential surface of the overhang portion 12d and the outer circumference 2c of the outer member 2, it is possible to prevent entry of muddy water, etc. into the sliding contact portion between the seal 8 and the metal annulus 12. Also, it is possible to easily discharge the once entered muddy water, etc. from the bearing apparatus due to the centrifugal force caused by rotation of the metal annulus 12 and the tapered configuration of the overhang portion 12d of the metal annulus 12. Thus, it is possible to prevent dwelling of muddy water, etc. on the sliding contact surfaces of the side lips 14a. Thus, wear on the lips 14a is reduced and it is possible to maintain stable sealability for a long term.

Although the structure shown here is of a third generation type bearing for a driven wheel, the wheel bearing apparatus of the present disclosure is not limited to such a structure. The present bearing apparatus may be applied to bearing structures of any generation type and to that of a driving wheel. In addition, although it is shown here as a double row angular contact ball bearing, using balls as rolling elements, the present disclosure is not limited to such a bearing and may be applied to a double row tapered roller bearing, using tapered rollers as rolling elements.

Since this second embodiment is different from the first embodiment only in the structure of the pulser ring, same reference numerals are used also in this embodiment for designating same parts having same functions of those used in the first embodiment.

FIG. 3 is a longitudinal section view of a second preferred embodiment of the vehicle wheel bearing apparatus. Since this second embodiment is different from the first embodiment only in the structure of the bearing, same reference numerals are used in this embodiment to designate the same parts having the same functions of those used in the first embodiment and their detailed description will be omitted.

This wheel bearing apparatus has a structure of a so-called fourth generation type formed as a unit of a wheel hub 17, a double row rolling bearing 18 and a constant velocity universal joint 19. The wheel hub 17 is integrally formed with a wheel mounting flange 6 at its outer side and has one (outer side) inner raceway surface 17a on its outer circumference and a cylindrical portion 17b extending from the inner raceway surface 17a.

The double row rolling bearing 18 includes an outer member 20, an inner member 21 and a double row rolling elements (balls) 3, 3. The outer member 20 is made of medium/high carbon steel including carbon of 0.40~0.80% by weight such as S53C. It is formed on its circumference with a body mounting flange 20b to be mounted on a body (not shown) of a vehicle. Its inner circumference includes double row outer raceway surfaces 20a, 20a. These double row outer raceway surfaces 20a, 20a are hardened by high frequency induction quenching to have a surface hardness of 58~64 HRC.

The inner member 21 is formed with double row inner raceway surfaces 17a, 22a on its outer circumference. This corresponds to the outer raceway surfaces 20a, 20a of the outer member 20. The outer side inner raceway surface 17a of the double row inner raceway surfaces 17a, 22a is formed on the outer circumference of the wheel hub 17. The inner side inner raceway surface 22a is formed on the outer circumference of the outer joint member 22, described below. In this case it should be appreciated that the inner member 21 includes the wheel hub 17 and the outer joint member 22. The double row rolling elements 3, 3 are contained between the double row inner and outer raceway surfaces. The rolling element3, 3 are held by cages 7, 7. Seals 8, 9 are mounted on either end of the outer member 20 to prevent leakage of lubricating grease sealed within the bearing and the entry of rainwater or dusts into the bearing from the outside.

The wheel hub 17 is made of medium/high carbon steel including carbon of 0.40-0.80% by weight such as S53C. It is hardened by high frequency induction quenching to have a region, from the inner raceway surface 17a to the cylindrical portion 17b, hardened with surface hardness of 58-64 HRC.

The inner circumferential surface of the wheel hub 17 is formed with an irregular portion 23. The irregular portion 23 is hardened by high frequency induction heating to have a surface hardness of HRC 54~64. The irregular portion 23 is formed with a knurl crisscross pattern knurl formed by combining a plurality of independent annular grooves formed by a lathe and a plurality of axial grooves formed by broaching as orthogonally crossed grooves or mutually inclined helical grooves. Each projection forming the irregular portion 23 may be pointed like a pyramid to increase the biting ability of the irregular portion 23.

The constant velocity universal joint 19 includes the outer joint member 22, a joint inner ring, a cage and torque transmitting balls (not shown). The outer joint member 22 includes a cup shaped mouth portion 24, a shoulder portion 25 and a hollow shaft portion 29. The shoulder portion 25 forms the bottom of the mouth portion 24. The hollow shaft portion 29 axially extends from the shoulder portion 25. An inner circumference of the mouth portion 24 is formed with axially extending curved track grooves 24a. An outer surface of the shaft portion 26 is formed with a cylindrical spigot portion 26a fit into the cylindrical portion 17b of the wheel hub 17, via a predetermined interference. A fitting portion 26b is formed from the spigot portion 26a to the end of the shaft portion 26. A numeral 27 denotes an end cap mounted in the shoulder portion 25 to prevent leakage of lubricating grease sealed within the bearing and to prevent the entry of rainwater or dusts into the bearing from the outside.

The wheel hub 17 and the outer joint member 22 are united by plastic deformation therebetween performed by inserting the shaft portion 26 into the wheel hub 17 so that the shoulder 25 of the outer joint member 22 is abutted against the end face of the cylindrical portion 17b of the wheel hub 17. The fitting portion 26b of the shaft portion 26 is radially outwardly expanded forcing the material of the fitting portion 26b to bite into the hardened irregular portion 23 of the wheel hub 17. This makes it possible to reduce the size and weight of the wheel bearing apparatus and to improve the strength and durability of the wheel hub as well as to maintain its pre-load for a long term. Thus, it is unnecessary to control pre-pressure to be applied to the wheel hub and the constant velocity universal joint by a fastening nut etc. as in the prior art.

Also in this embodiment, the metal annulus 12 is mounted on the inner side base 6b of the wheel mounting flange 6. The outer side seal 8 is arranged to be in sliding contact with the metal annulus 12. The seal 8 includes the metal core 13 fit into the inner circumference of the outer side end of the outer member 20. The sealing member 14 is integrally adhered to the metal core 13, via vulcanized adhesion.

The sealing member 14 is adhered to the outer side surface of the metal core 13. The sealing member 14 includes a pair of side lips 14a, 14b that extend on a slant radially outward. A grease lip 14c is adhered to the inner circumferential edge of the metal core 13. The grease lip 14c extends radially inward and slants toward the inner side of the bearing. The side lips 14a, 14b and the grease lip 14c slidingly contact the metal annulus 12 mounted on the inner side base 6b of the wheel mounting flange 6.

Similarly to the first embodiment, a corner of the base portion 6b between the shoulder portion 4e of the wheel hub 4 and the wheel mounting flange 6 is formed with a circular arc cross-section. The curved portion 12b of the metal annulus 12 is formed with a circular arc cross-section. The radius of curvature is set larger than that of the base portion 6b. This makes it possible to prevent the curved portion 12b of the metal annulus 12 from floating from the base 6b of the wheel mounting flange 6 by interference of the curved portion 12b of the metal annulus 12 against the base portion 6b of the wheel mounting flange 6. Thus this prevents the generation of an interstice between the side surface 6c of the wheel mounting flange 6 and the disc shaped portion 12c of the metal annulus 12. Thus, it is possible to suppress variation of interference of the side lips 14a, 14b and to assure stable sealability.

The vehicle wheel bearing apparatus of the present disclosure can be applied to any generational type wheel bearing apparatus irrespective whether it is a driving wheel or a driven wheel.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member formed with a body mounting flange on its outer circumference, the body mounting flange is to be mounted on a body of a vehicle, the outer member having an inner circumference including double row outer raceway surfaces;
   an inner member including a wheel hub and an inner ring or an outer joint member of a constant velocity universal joint, the wheel hub is formed at one end with a wheel mounting flange, the wheel hub having an outer circumference including one inner raceway surface opposing to one of the double row outer raceway surfaces, a cylindrical portion axially extending from the inner raceway surface, and the inner ring or outer joint member of a constant velocity universal joint being press-fit onto the cylindrical portion of the wheel hub and the inner ring or outer joint member outer circumference including an inner raceway surface opposing the other of the double row outer raceway surfaces;
   double row rolling elements freely rollably contained between the outer raceway surfaces of the outer member and the inner raceway surfaces of the inner member;
   seals mounted within annular openings formed between the outer member and the inner member;
   an inner side base portion of the wheel mounting flange is formed with a circular arc cross-section;
   a metal annulus mounted on the base portion is press-formed from a steel plate, the metal annulus further comprising a cylindrical fitting portion, a curved portion, a disk shaped portion, and an overhang portion, the cylindrical fitting portion fit onto a shoulder portion of the wheel hub, the curved portion formed with a circular arc cross-section that corresponds to a cross-sectional configuration of the base portion, the disk shaped portion extends radially outward from the curved portion and is in close contact with an inner side surface of the wheel mounting flange, and the overhang portion extends from a radially outermost portion of the disk shaped portion in a direction away from the wheel mounting flange;
   an elastic lip extends from the overhang portion of the metal annulus toward a side surface of the wheel mounting flange, the elastic lip elastically contacts the side surface of the wheel mounting flange with a desired contacting force via a predetermined interference, and an annular sealing space is formed between the elastic lip, wheel mounting flange and a connecting portion of the metal annulus, the annular sealing space positioned radially inward of the elastic lip;
   an outer side seal of the seals comprises a metal core and a sealing member, the metal core is fit into an inner circumference of an end of the outer member, the sealing member has side lips and a grease lip, the side lips slant radially outward, the grease lip slants radially inward toward the inner side of the bearing, the side lips and the grease lip slidingly contact the metal annulus; and
   the circular arc-cross section of the inner side base portion of the wheel mounting flange is formed with a radius of curvature "r", the circular arc cross-section of the metal annulus is formed with a radius of curvature "R", and the radii of curvature "r" and "R" are set with a relationship of R>r and a gap is formed between the inner side base portion and the metal annulus at the curved portion which prevents floating of the curved portion of the metal annulus from the base of the wheel mounting flange by interference of the curved portion of the metal annulus against the base portion of the wheel mounting flange, this forms a contact area between the side surface of the wheel mounting flange and the disk shaped portion of the metal annulus which suppresses variation of interference of the side lips to assure stable sealability.

2. The vehicle wheel bearing apparatus of claim 1, wherein the overhang portion of the metal annulus is opposed to an outer circumference of the outer member via a radial gap.

3. The vehicle wheel bearing apparatus of claim 2, wherein the overhang portion of the metal annulus that is opposed to the outer circumference of the outer member via the radial gap and formed as having a flared configuration gradually diverging toward its end at a predetermined slant angle.

4. The vehicle wheel bearing apparatus of claim 3, wherein the radial gap between the overhang portion of the metal annulus and the outer circumference of the outer member is set at 1 mm or less, and the slant angle ($\theta$) is set at 15° or less.

5. The vehicle wheel bearing apparatus of claim 1, wherein an axially projecting elastic member is integrally adhered to the connecting portion between the disk shaped portion and the overhang portion of the metal annulus.

6. The vehicle wheel bearing apparatus of claim 1, wherein a surface roughness of the steel plate forming the metal annulus is set within a range of 0.2-0.6 μm Ra.

7. The vehicle wheel bearing apparatus of claim 1, wherein the metal annulus is made from a steel plate with corrosion resistance.

* * * * *

UNITED STATES PATENT AND TRADEMARK OFFICE
CERTIFICATE OF CORRECTION

PATENT NO. : 8,303,190 B2
APPLICATION NO. : 12/626790
DATED : November 6, 2012
INVENTOR(S) : Kazuhisa Shigeoka It is certified that error appears in the above-identified patent and that said Letters Patent is hereby corrected as shown below:

Column 5
Line 4 "sea lability" should be --sealability--

Column 8
Line 57 "angle" should be --angle $\theta$--

Signed and Sealed this
Ninth Day of April, 2013

Teresa Stanek Rea
*Acting Director of the United States Patent and Trademark Office*